United States Patent Office 3,674,630
Patented July 4, 1972

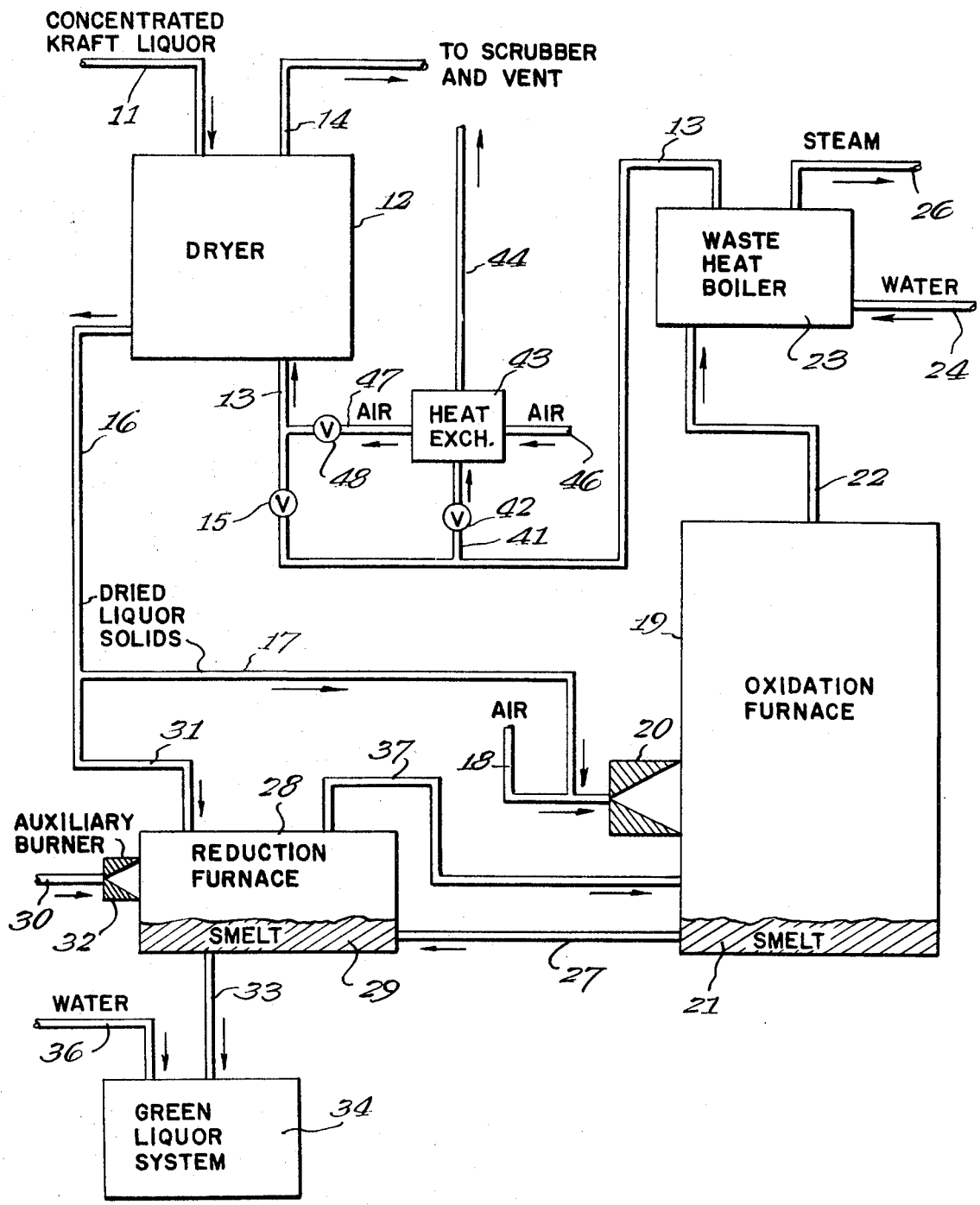

3,674,630
KRAFT LIQUOR RECOVERY SYSTEM INCLUDING PHYSICALLY ISOLATED OXIDATION AND REDUCTION STAGES
George G. Copeland, Western Springs, Ill., assignor to Copeland Systems, Inc., Oak Brook, Ill.
Filed Nov. 14, 1969, Ser. No. 876,727
Int. Cl. D21c *11/12*
U.S. Cl. 162—30                                      8 Claims

ABSTRACT OF THE DISCLOSURE

Kraft black liquor is treated for recovery of its heat and chemical content by drying to produce solid material, burning the solid material in an oxidation furnace to produce hot gases and a molten smelt containing the inorganic constituents. Heat is recovered from the hot gases by heat exchange, while the molten smelt is transferred to a separate reduction furnace, where chemical reduction is accomplished by reaction with carbon. The reduced smelt is then further regenerated for use by conventional means. The invention eliminates the explosion and odor problems associated with conventional recovery systems, at a lower equipment cost.

---

This invention relates to a sulfate or kraft liquor recovery system and more particularly it relates to an improved process and apparatus for recovering for reuse the inorganic chemical constituents of kraft liquor in an efficient, safe, and economical manner.

The spent (black) liquor from sulfate or kraft pulping operations contains, in addition to the soluble components of the wood which was treated, the dissolved treating chemicals, comprising sodium sulfide and sodium hydroxide. These chemicals are relatively expensive and must be recovered for reuse in order to make the sulfate process economically attractive.

In the conventional kraft recovery system, as heretofore practiced, the black liquor, containing about 10 to 15% of dissolved organic and inorganic solids, is evaporated by conventional multiple effect apparatus to a solids concentration of about 55–65% by weight. The concentrated liquor is then fed to a kraft recovery furnace, in which the organic constituents are burned and leave the furnace as gaseous products of combustion, while the sodium salts collect in the base of the recovery furnace as a molten ash or smelt. The combustion air supplied to the furnace is controlled in such a manner as to create within the furnace two zones, an upper oxidizing zone in which the water content of the black liquor is evaporated, and the organic solid materials are decomposed into combustible gases, which are burned, and carbon, a portion of which is burned. The oxidized inorganic sodium salts, comprising sodium sulfate and sodium carbonate, and the remainder of the carbon content fall to a zone at the bottom of the furnace which is maintained under reducing conditions. In the reducing zone the remaining carbon is burned and sodium sulfate is reduced to sodium sulfide. The molten smelt of sodium salts which collects at the base of the furnace is then dissolved in water, treated with lime to convert the sodium carbonate to sodium hydroxide, and the regenerated mixture of sodium sulfide and sodium hydroxide is recycled for use in the pulping mill.

In order to improve the economics of the process, it is desired to recover as much as possible of the heat generated when the organic constituents of the black liquor are burned in the recovery system. For this purpose, the recovery furnace is lined with boiler tubes through which water is passed to generate steam, which is then used as process steam in the pulping operation.

The conventional kraft recovery furnace, as described above, has a number of deficiencies. Because of the relatively complex function of the recovery furnace, which combines oxidation, reduction, and steam generation in one unit under high temperature conditions, the cost of the equipment is very high. An additional problem is the formation of unpleasant odors resulting from the production of malodorous sulfur compounds, such as hydrogen sulfide and mercaptans, in the reducing zone of the furnace. Some of these gases pass through the furnace without being oxidized and create odor problems in the vicinity of the recovery furnace. Still another problem is the risk of an explosion, which will occur if water is accidentally introduced into the pool of smelt at the base of the furnace. Such introduction might occur if weak black liquor having a high water content is introduced into the furnace, or if one of the boiler tubes in the wall of the furnace is ruptured, permitting water to flow into the unit. Because of the distinct possibility of serious explosion, great care in the operation of the conventional kraft recovery furnace is necessary.

The above noted deficiencies of the conventional kraft liquor recovery system are overcome by the system of the invention, in which the various functions of the recovery furnace are separated and isolated from each other, permitting independent control which eliminates the odor problem and the explosion hazard at a lower equipment cost.

The process of the invention will be better understood from the following detailed description thereof, taken in conjunction with the accompnaying drawing which represents schematically a typical embodiment of the invention. The description will assume the operation of a typical plant in which the production of 1.2 tons of pulp generates about 6150 pounds of concentrated black liquor containing 65% solids having a heat content of about 6700 B.t.u. per pound.

The concentrated black liquor, containing about 4,000 lbs. of dissolved solids, is fed through line 11 into dryer 12 for removal of its water content. Dryer 12 is suitably a conventional fluidized-bed or spray dryer in which drying is effected by hot gases entering at a temperature of about 500° F. through line 13. The gases and evolved water vapor leave dryer 12 through line 14 to a scrubber and vent (not shown). The dried solids, amounting to about 4,000 lb., leave dryer 12 through line 16 and are thereafter separated into two fractions. The larger fraction, amounting to about 3300 lbs. is conveyed through line 17 and, combined with combustion air entering through line 18, is injected by blower 20 into oxidation furnace 19, wherein substantially complete combustion of all the combustible material in the dried liquor solids occurs. The amount of combustion air entering through line 18 is adjusted so as to obtain complete combustion while limiting the maximum temperature in oxidation furnace 19 to a suitable value less than about 2400° F. to avoid damage to the oxidation furnace, which might result from excessively high temperatures. In the example under consideration, about 80% excess air is used for this purpose. Oxidation furnace 19 is suitably a simple refractory bricklined furnace, at the base of which the inorganic components of the dried liquor solids collect as a molten smelt 21, at a temperature of between about 1500° F. and 2400° F. As a result of the oxidizing conditions which exist in furnace 19, the sodium which existed as sodium sulfide ($Na_2S$) in the liquor solids is converted to sodium sulfate ($Na_2SO_4$), while the sodium hydroxide (NaOH) content of the liquor solids is converted to sodium carbonate ($Na_2CO_3$).

The combustion gases which are generated in furnace 19, leaving the furnace through line 22 at a temperature of up to about 2400° F., pass to waste heat boiler 23, wherein a portion of the heat content of the gases is used to convert water entering through line 24 to steam, leaving through line 26. The combustion gases, which are cooled by passage through waste heat boiler 23 to a temperature of about 500° F., pass through line 13 and valve 15 and are introduced into dryer 12, where they are used to dry the concentrated liquor entering the dryers, as previously described.

In order to minimize any possible odor problems by avoiding direct contact of the hot combustion gases with the liquor solids, an alternative flow path is provide, to be used if necessary. In the alternative procedure, the combustion gases flow from line 13 through line 41 (valve 15 being closed), valve 42, heat exchanger 43 and line 44 to the srubber and vent. In heat exchanger 43, air entering through line 46 is heated and is passed through line 47 and valve 48 to dryer 12, where it is used to dry the concentrated black liquor.

The molten smelt 21, which collects at the bottom of oxidation furnace 19, is passed through line 27, suitably under gravity flow, to the base of reduction furnace 28, and collects as a pool of molten smelt 29 therein. The function of reduction furnace 28 is to reduce the sodium sulfate content of the entering molten smelt to sodium sulfide. This reaction is suitably accomplished by the introduction through line 31 into furnace 28 of a portion (700 lb.) of the dried liquor solids produced by dryer 12. Auxiliary fuel is introduced into reduction furnace 28 through line 30 and auxiliary burner 32 as necessary to maintain a temperature of about 1400–1700° F., and suitably about 1600° F. in the furnace Alternatively, the reduction of sodium sulfate can be accomplished in an electrically heated reduction furnace. As a result of the reducing conditions which exist in furnace 28, the sodium sulfate present in the smelt is converted to sodium sulfide by reaction with the carbon contained in the dried liquor solids introduced into the furnace 28. The reduced smelt leaves furnace 29 through line 33 to green liquor system 34 where it is combined with water, entering through line 36, and is thereafter treated in the conventional manner.

Any gases generated in reduction furnace 28 pass through line 37 to oxidation furance 19, where they are oxidized and combined with the other combustion products which are generated therein.

It will be seen that the recovery system of the invention possesses a number of significant advantages over the conventional process. The physical separation of the oxidation zone from the reduction zone permits independent control and most efficient operation of each of these functions. Because the oxidation furnace is designed for maximum efficiency in oxidation, the malodorous sulfur compounds which escape oxidation in the conventional recovery furnace are completely oxidized and therefore present no odor problem.

The separation of the steam-generating heat recovery system from the oxidation furnace eliminates two of the serious problems present in the conventional recovery furnace. There is no possibility of accidental introduction of water into the pool of molten smelt in the furnace, thus eliminating the explosion hazard. Furthermore, the use of a simple conventional waste heat boiler for steam generation in place of the complicated and expensive construction required in the conventional recovery furnace greatly reduces the cost of the entire system.

The foregoing detailed description has been given for clearness of understanding only, and no unnecessary limitations should be understood therefrom as modifications will be obvious to those skilled in the art.

I claim:

1. A process for treating waste sulfate pulping liquor containing organic and inorganic materials which comprises:

concentrating said waste liquor to a total solids concentration of about 55–65% by weight;

drying said concentrated liquor to produce dried liquor solids containing carbon;

burning at least a major proportion of said dried liquor solids in an oxidation furnace to effect substantially complete combustion of said organic material and to produce hot gaseous products of combustion, maintaining the temperature in said furnace sufficiently high to produce a molten smelt comprising the inorganic residue of said liquor solids;

transferring said smelt to a reduction furnace physically isolated from said oxidation furnace, and reducing at least some of the inorganic constituents of said smelt therein by reaction with carbon; and collecting said inorganic constituents for reuse.

2. The process of claim 1 in which a portion of the heat content of the gaseous products of the combustion of said organic material is recovered by heat exchange and the remainder of said heat content is used to concentrate said waste liquor.

3. The process of claim 1 wherein said inorganic material contained in said liquor comprises sodium sulfide and sodium hydroxide, said sodium sulfide being oxidized to sodium sulfate in said oxidation furnace and reduced back to sodium sulfide in said reduction furnace.

4. The process of claim 1 wherein the reduction of said inorganic constiuents is effected by reaction with the carbon content of a portion of the dried liquor solids at elevated temperatures.

5. Apparatus for treating waste sulfate pulping liquor containing organic and inorganic materials which comprises:

means for concentrating said waste liquor to a solids concentration of about 55–65% by weight;

means for drying said concentrated liquor to produce dried liquor solids;

an enclosed oxidizing furnace for burning said dried liquor solids, wherein said organic material is substantially completely oxidized and converted to gaseous products of combustion and said inorganic material is oxidized and melted to form a liquid smelt;

a reduction furance separately enclosed from said oxidizing furnace, wherein said liquid smelt is chemically reduced;

means for conveying said smelt from said oxidizing furnace to said reduction furnace;

means for conveying said gaseous combustion products to a heat exchange means wherein a portion of the heat content of said gaseous combustion products is recovered by heat exchange; and collection means for collecting the reduced smelt for reuse.

6. The apparatus of claim 5 wherein said drying means is a spray dryer.

7. The apparatus of claim 5 wherein said drying means is a fluidized-bed dryer.

8. The apparatus of claim 5 wherein said conveying means is gravity operated.

References Cited

UNITED STATES PATENTS

| 1,931,536 | 10/1933 | Goodell | 23—48 |
| 2,291,833 | 8/1942 | Savell | 162—30 |
| 2,406,581 | 8/1946 | Bergstrom et al. | 23—48 |
| 3,322,492 | 5/1967 | Flood | 162—30 X |
| 3,574,051 | 4/1971 | Shah | 162—30 |

S. LEON BASHORE, Primary Examiner

A. D'ANDREA, JR., Assistant Examiner

U.S. Cl. X.R.

23—48